3,406,236
METHOD OF MOLDING ARTICLES UTILIZING MOLD COATED WITH RELEASE AGENT COMPRISING POLYSILOXANE - POLYOXYALKYLENE MIXTURE
Wilfried Kniege, Cologne-Mulheim, Germany, assignor to Farbenfabriken Bayer Aktiengesellschaft, Leverkusen, Germany, a corporation of Germany
No Drawing. Filed Jan. 5, 1965, Ser. No. 423,602
Claims priority, application Germany, Jan. 15, 1964, F 41,747
5 Claims. (Cl. 264—338)

ABSTRACT OF THE DISCLOSURE

Mold release agent comprising a mixture of a hydrocarbon-substituted polysiloxane having a viscosity at room temperature of about 40 to 20,000 centistokes, and a polyoxyalkylene in an amount of about 15% to 65% based on the weight of the polysiloxane, in which the polyoxyalkylene is a water soluble copolymer having a molecular weight between about 200 and 2500 and composed of ethylene oxide and propylene oxide in a molar ratio between about 30:70 and 85:15.

---

The invention relates to improved agents for coating vulcanization molds for the production of rubber articles.

It is known to coat or spray such molds with preparations of organo-polysiloxanes, in order to achieve an easy detaching of the vulcanizate from the wall of the mold, the polysiloxanes having the advantage over the known silicon-free release agents, that the wall remains largely free from incrustations. However, it is a disadvantage of the methyl-polysiloxanes hitherto mostly used, that the rubber articles produced with the use thereof cannot be varnished or bonded, since a small amount of polysiloxane is always transferred to their surface. It is further known that this disadvantage can be obviated by the use of ethylene or propylene glycol dialkyl silyl esters, but the necessity of using such specific organo-silicon compounds involves a substantial addition to the cost of the vulcanization process.

It has now been found in accordance with the present invention that the same purpose can also be achieved with the simplest organo-polysiloxane oils, usually methyl-polysiloxane oils, if these are used in admixture with specific polyglycol ethers. The mold release agents according to the invention comprise mixtures of a hydrocarbon-substituted polysiloxane and a polyoxyalkylene in an amount of 15 to 65 percent by weight thereof, and are characterized in that the polyoxyalkylene is a water-soluble copolymer of ethylene oxide and propylene oxide in a molar ratio between 30:70 and 85:15, with a molecular weight between 200 and 2500, preferably between 1000 and 1500.

It is of no importance whether the polyoxyalkylene is terminated by free hydroxyl groups, or whether one or both of the hydroxyl groups are etherified in known manner with an alkanol, e.g. butanol, i.e. whether it is an $\alpha,\omega$-dihydroxy polyglycol ether or a polyglycol monoalkyl or dialkyl ether.

The hydrocarbon-substituted polysiloxanes of the aforesaid mixture are the same oils as usually employed in mold release agents, the substituents thereof being methyl or methyl and phenyl radicals, and the terminal siloxane units being trimethyl siloxy. The viscosity of said polysiloxanes may vary from 40 to 20,000 centistokes at room temperature; a customary range is from 300 to about 1000 cs. Frequently it is also advantageous to use a mixture of low viscous and high viscous polysiloxane oils, resulting in a viscosity of e.g. 1000 cs.

The polysiloxane/polyether mixture is preferably used in an aqueous emulsion, as is customary also in other cases. It can be produced with the use of commercially available organo-polysiloxane emulsions to which the oxyethylene-oxypropylene copolymer is simply added with stirring. As is customary, the release agent improved according to the invention is applied in a strongly diluted form, containing, for example, 0.5 percent by weight of non-aqueous substance.

For reasons which have not yet been explained, no wetting or adhesion difficulties arise on the surfaces of the molded articles produced therewith, but they do arise, if the copolymers used according to the invention are replaced by a pure polyoxyethylene or a pure polyoxypropylene. In these cases the disadvantages are the same as those encountered with the use of organopolysiloxanes without polyglycol ether.

The following examples are given for the purpose of illustrating the invention.

Examples 7 grams of a polyglycol ether formed from equal parts by weight of ethylene oxide and propylene oxide and having a viscosity of 315 centistokes (at 20° C.) are mixed with 100 g. of a commercially available aqueous emulsion of 35 percent by weight of a trimethylsiloxy end stopped poly-dimethylsiloxane oil having a viscosity of 1200 cs., and being emulsified in the presence of 0.5 percent by weight (calculated on the oil) of sodium laurylsulphate, and the emulsion is diluted with 10 litres of water.

When a hot vulcanization mold is sprayed with this dilute emulsion, and a rubber mixture of

| | Parts by weight |
|---|---|
| Smoked sheets | 100 |
| Silica filler | 50 |
| Zinc oxide | 5 |
| Titanium dioxide | 10 |
| Stearic acid | 0.5 |
| Sulphur | 2.5 |
| Benzothiazyl-2-diethylsulphene-amide | 1.4 | is vulcanized in this mold at 150° C. for 15 minutes, a rubber article is obtained which can be released from the mold easily and without being damaged.

For varnishing this article, a solution may be used, which is a mixture of 100 parts by weight of a commercially available solution of 8 percent by weight of polyester in a toluene/methylene chloride mixture, and 18 parts by weight of a solution of 20 percent by weight of tri-(isocyanato-phenyl)-methane in methylene chloride. When the rubber article produced in the manner described above is dipped, without further treatment, into this varnish solution for 5 seconds and allowed to dry in air, it is coated with an entirely faultless and firmly adhering glossy film.

When a comparative experiment is carried out without the addition of polyglycol ether, but otherwise in the manner described above, a faulty and mottled surface is obtained after the varnishing of the rubber article.

The same results are obtained when the vulcanization mold is treated with emulsions the concentration of which is three times as high as that of the emulsion described above.

If the vulcanization is carried out as described above, but the varnishing is omitted and instead the rubber articles are bonded by means of one of the various commercially available adhesives, then faultless bondings are obtained in each case where the release agent according to the invention is used, but if the organo-polysiloxane emulsion is used without the addition of polyglycol ether, then a technically satisfactory result is not achieved in a single case.

The results mentioned above were confirmed for other elastomers used in place of natural rubber, and for various commercially available organo-polysiloxane emulsions.

What I claim is:

1. In the method of molding rubber articles, the improvement for achieving enhanced mold release of the articles upon molding, which comprises carrying out the molding of rubber articles in a mold coated with a mold release agent comprising a mixture of a trimethylsiloxy-terminated hydrocarbon-substituted polysiloxane selected from the group consisting of methyl-substituted and methyl and phenyl-substituted polysiloxane having a viscosity at room temperature in the range from 40 to 20,000 centistokes, and a polyoxyalkylene in an amount of 15 to 65% by weight calculated on the said polysiloxane, in which the polyoxyalkylene is a water soluble copolymer of a molecular weight of between 200 and 2500 composed of ethylene oxide and propylene oxide in a molar ratio between 30:70 and 85:15.

2. Improvement according to claim 1 wherein the said hydrocarbon-substituted polysiloxane is a trimethylsiloxy-terminated poly-dimethylsiloxane and the said polyoxyalkylene has a molecular weight of between 1000 and 1500.

3. Improvement according to claim 1 wherein a mixture of low viscous and high viscous hydrocarbon substituted polysiloxane oils having a resultant viscosity of about 1000 centistokes is present.

4. Improvement according to claim 1 wherein said mixture is used in the form of an aqueous emulsion.

5. Improvement according to claim 4 wherein the aqueous emulsion contains an emulsifier in an amount of about 0.5% by weight based on the amount of polysiloxane present.

References Cited
UNITED STATES PATENTS

| | | | |
|---|---|---|---|
| 2,674,619 | 4/1954 | Lundsted | 260—485 |
| 2,702,276 | 2/1955 | Green | 106—287 X |
| 2,844,486 | 7/1958 | Lamar | 106—308 |
| 2,846,323 | 8/1958 | Oppliger | 106—287 X |
| 2,955,047 | 10/1960 | Terry | 106—287 X |
| 2,586,211 | 2/1952 | Currie | 106—38.22 |
| 2,811,408 | 10/1957 | Braley | 117—5.3 X |
| 2,846,458 | 8/1958 | Haluska | 106—38.22 X |
| 2,901,361 | 8/1959 | Meisel | 106—38.25 X |
| 3,186,855 | 6/1965 | Miller | 117—5.3 X |

JAMES A. SEIDLECK, *Primary Examiner.*

L. B. HAYES, *Assistant Examiner.*